(12) United States Patent
Funk

(10) Patent No.: US 7,019,626 B1
(45) Date of Patent: Mar. 28, 2006

(54) MULTI-FUEL ENGINE CONVERSION SYSTEM AND METHOD

(75) Inventor: Werner Funk, Encinitas, CA (US)

(73) Assignee: Omnitek Engineering, Inc., San Marcos, CA (US)

( * ) Notice: Subject to any disclaimer, the term of this patent is extended or adjusted under 35 U.S.C. 154(b) by 0 days.

(21) Appl. No.: 11/071,508

(22) Filed: Mar. 3, 2005

(51) Int. Cl.
B60Q 1/00 (2006.01)

(52) U.S. Cl. ............... 340/438; 123/205; 123/525; 123/575; 60/740

(58) Field of Classification Search ............... 340/438; 123/205, 525, 526, 575–578; 60/740
See application file for complete search history.

(56) References Cited

U.S. PATENT DOCUMENTS

| | | |
|---|---|---|
| 3,077,189 A | 2/1963 | Earnshaw |
| 3,703,886 A | 11/1972 | Witzky |
| 4,019,483 A | 4/1977 | Konomi |
| 4,306,532 A | 12/1981 | Camacho |
| 4,517,928 A | 5/1985 | Wolters |
| 4,597,364 A | 7/1986 | Young |
| 4,641,625 A | 2/1987 | Smith |
| 4,696,278 A | 9/1987 | Ito |
| 4,817,568 A * | 4/1989 | Bedford .................. 123/431 |
| 4,831,993 A | 5/1989 | Kelgard |
| 4,843,558 A | 6/1989 | Bergmann |
| 4,955,326 A | 9/1990 | Helmich |
| 5,000,138 A | 3/1991 | Bennett |
| 5,070,850 A | 12/1991 | Davis |
| 5,136,986 A | 8/1992 | Jensen |
| 5,140,959 A | 8/1992 | Durbin |
| 5,150,685 A | 9/1992 | Porter |
| 5,224,457 A | 7/1993 | Arsenault |
| 5,226,396 A | 7/1993 | Bailey |
| 5,315,981 A | 5/1994 | Chen |
| 5,327,813 A | 7/1994 | De Bell |
| 5,330,031 A | 7/1994 | Hill |
| 5,355,854 A | 10/1994 | Aubee |
| 5,370,097 A | 12/1994 | Davis |
| 5,398,724 A | 3/1995 | Vars |
| 5,408,957 A | 4/1995 | Crowley |
| 5,408,967 A | 4/1995 | Foster |
| 5,450,829 A | 9/1995 | Beck |
| 5,487,362 A | 1/1996 | Wellev |
| 5,526,786 A | 6/1996 | Beck |
| 5,531,199 A | 7/1996 | Bryant |
| 5,628,294 A | 5/1997 | Krieckaert |
| 5,664,535 A | 9/1997 | Peeters |
| 5,692,478 A | 12/1997 | Nogi |
| 5,806,490 A | 9/1998 | Nogi |
| 5,937,800 A | 8/1999 | Brown |
| 5,996,558 A | 12/1999 | Ouellette |

(Continued)

Primary Examiner—Thomas J. Mullen, Jr.
Assistant Examiner—Samuel J Walk

(57) ABSTRACT

Systems, methods and apparatus' of converting an engine into a multi-fuel engine are provided. One embodiment reduces particulate emissions and reduces the amount of combusted gasoline or diesel fuel by replacing some of the fuel with a second fuel, such as natural gas, propane, or hydrogen. One feature of the present invention includes a control unit for metering the second fuel. Another feature of the present invention includes an indicator that indicates how much second fuel is being combusted relative to the diesel or gasoline. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

16 Claims, 3 Drawing Sheets

U.S. PATENT DOCUMENTS

| | | |
|---|---|---|
| 6,050,246 A | 4/2000 | Abdelmesih |
| 6,112,765 A * | 9/2000 | Boyer ..................... 137/554 |
| 6,250,261 B1 | 6/2001 | Santarossa |
| 6,289,871 B1 | 9/2001 | Brown |
| 6,427,660 B1 | 8/2002 | Yang |
| 6,505,612 B1 | 1/2003 | Cipressi |
| 6,543,395 B1 | 4/2003 | Green |
| 6,591,817 B1 | 7/2003 | Deutsch |
| 2002/0020388 A1 * | 2/2002 | Wright et al. ............... 123/304 |
| 2005/0113993 A1 * | 5/2005 | Son ............................ 701/30 |
| 2005/0121005 A1 * | 6/2005 | Edwards .................... 123/525 |
| 2005/0205021 A1 * | 9/2005 | Shute .................... 123/27 GE |

* cited by examiner

MULTI-FUEL ENGINE CONVERSION SYSTEM AND METHOD

FIELD OF THE INVENTION

The present invention generally relates to internal combustion engines. More particularly, the present invention concerns a system, method and apparatus for enabling more than one fuel to be employed in an internal combustion engine.

BACKGROUND OF THE INVENTION

Diesel engines are ubiquitous throughout the world. Valued for their power, performance, fuel economy, and durability, diesel trucks, buses, pumps and generators are more common than spark ignition engines. However, concerns over diesel exhaust, increasingly strict emissions regulations and rising fuel costs are forcing operators and fleet owners to seek cleaner alternatives.

Natural gas is one answer. Readily available in most parts of the world, it is generally cleaner than diesel and, due to local sources, natural gas is significantly cheaper than diesel in many parts of the world.

With the availability of inexpensive natural gas, many fleet owners, and other operators want to retrofit their diesel engines to burn natural gas. The problem is finding a way to cheaply do so. In addition, some owners of gasoline engines are interested in taking advantage of the lower costs of natural gas.

Conventional 100% conversion technologies, where a diesel engine is converted to burn, or combust 100% natural gas, require substantial modifications to the engine as the compression ratio has to be reduced and an ignition system must be installed. This takes time, is costly, and requires expensive special tooling.

Alternatively, diesel engines can be converted to operate in a "dual-fuel" or "multi-fuel" mode. In this conversion, a small amount of diesel is injected into the combustion cylinder, sometimes known as "pilot-injection," which ignites, or combusts the alternative fuel (natural gas, propane or hydrogen) which was introduced into the intake manifold, and drawn into the combustion chamber. In this way, a percentage of the diesel can be replaced by the substitute gas resulting in lower exhaust emissions, especially particulate matter (PM). In addition, fuel costs are reduced, because natural gas is cheaper than diesel.

This multi-fuel operation does not require the substantial engine modifications of a 100% conversion. The multi-fuel conversions are performed so that the engine can be re-converted to operate on 100% diesel very easily, thus, the diesel fuel injectors are not replaced. However, the percentage of alternative fuel varies between idle, part throttle and full load or throttle. At idle the engine runs almost 100% on diesel because the amount of diesel being injected by the original injectors cannot be reduced further. At part throttle up to about 90% of the alternative fuel is used, but to protect the engine from destruction and overheating at full load, the percentage of the alternative fuel usually varies from 20% to 80%.

The amount of alternative fuel, such as natural gas, propane or hydrogen that is combusted must be carefully monitored, as the original diesel engine is not designed for the higher combustion temperatures generated by the alternative fuel. In addition, to maximize the cost savings associated with alternative fuel use, operators should be informed as to how much alternative fuel is being combusted.

Therefore, a need exists for an inexpensive diesel or gasoline engine conversion method and apparatus that informs the operator of the amount of alternative fuel that is being combusted.

SUMMARY OF THE INVENTION

To address the above needs, the present invention provides novel methods and apparatus' for converting diesel or gasoline engines into multi-fuel engines.

One feature of the present invention relates to a method and an apparatus for metering an amount of alternative fuel into a diesel, or gasoline engine.

Another feature of the present invention relates to an indicator, whether aural or visual, that can be heard or seen by an operator that informs the operator of the amount of alternative fuel that is being combusted.

These and other features and advantages of the present invention will be appreciated from review of the following detailed description of the invention, along with the accompanying figures in which like reference numerals are used to describe the same, similar or corresponding parts in the several views of the drawings.

Figure 1:
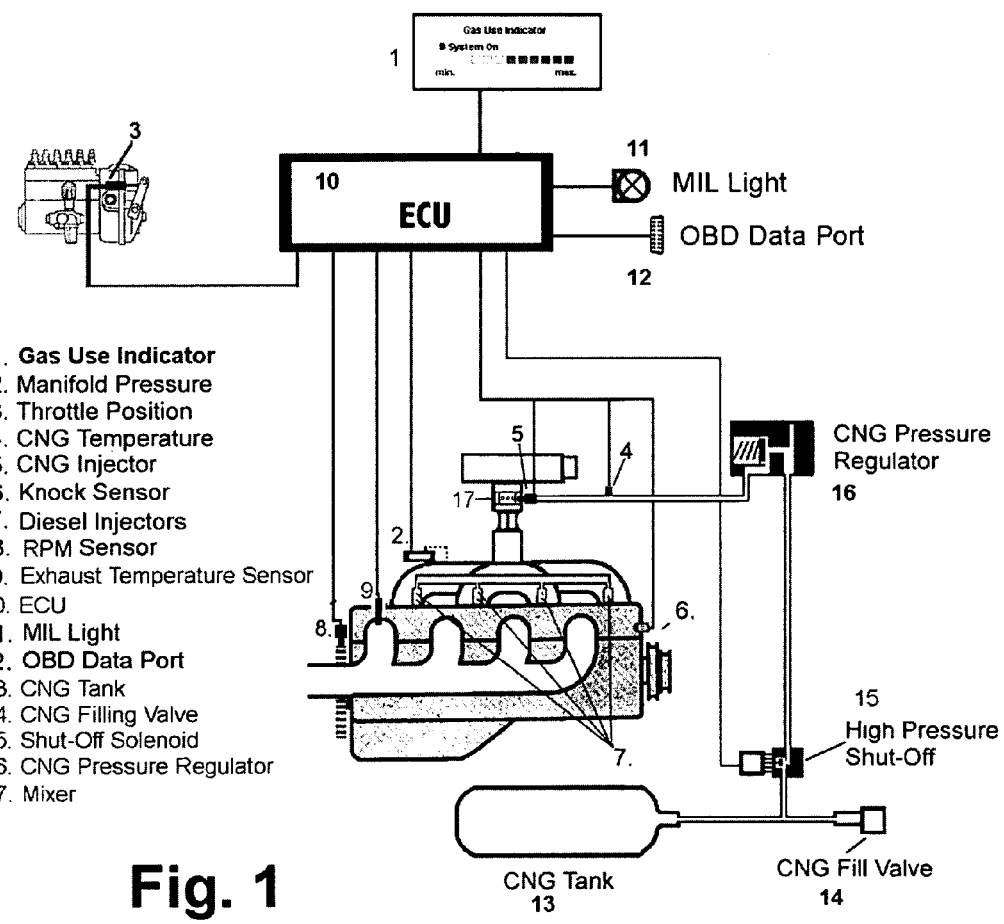
FIG. 1 is a schematic illustration of one embodiment of a multi-fuel system constructed according to the present invention.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

One embodiment of the present invention provides a method of operating a diesel, or gasoline engine in a multi-fuel mode that uses an alternative fuel in addition to the diesel or gasoline fuel, thereby reducing emissions and lowering fuel costs. This embodiment employs a controller that communicates with a plurality of sensors that provide information to the controller. The controller then regulates an amount of natural gas, or other alternative fuel that is introduced into the engine's intake manifold, or directly into the engine's combustion chamber.

Figure 2A:
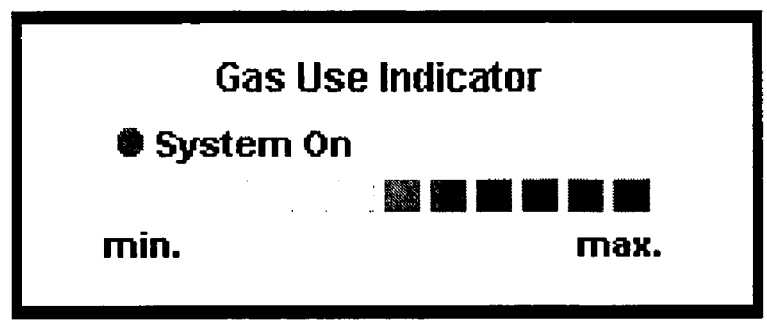
FIGS. 2A and 2B are schematic illustrations of two embodiments of an alternative fuel indicator.

Another embodiment of the present invention uses an indicator, such as a light-emitting diode (LED) display, an analog gauge, or an aural tone, which informs the driver how much alternative fuel is being used. The amount of alternative fuel used is, in part, controlled by throttle position (i.e., "gas pedal" position), which is manipulated by the operator. Thus, the operator can control how much alternative fuel he is using by watching the indicator and adjusting the throttle position as desired. In this way, the indicator can aid the operator to use the most amount of alternative fuel, thereby minimizing fuel costs. For example, as shown in FIG. 2A, the indicator 30 may comprise a group of LED's that may sequentially illuminate, thereby helping the operator to maximize alternative fuel consumption. Alternative embodiments of indicator 30 will be discussed below.

One feature of the present invention is that it can be retrofitted to an existing engine, or installed as original equipment. One embodiment of the present invention comprises a diesel, or gasoline engine particulate matter (PM) emission reduction multi-fuel system. Once installed, the engine will achieve immediate and significant reductions in PM emissions, and a reduction in operating expenses by using inexpensive natural gas instead of diesel fuel.

The present invention may use any form of alternative fuel or gas, such as natural gas, propane or hydrogen. In one method of the present invention, natural gas is injected into the intake air stream as a fuel to replace some of the diesel fuel. The present invention has demonstrated a reduction of PM by 60%, or more. One feature of the present invention is its ease of installation and cost effectiveness.

Referring now to FIG. 1, one embodiment of a multi-fuel conversion (MFC) 20 is illustrated. Generally, the MFC 20 can be installed on diesel or gasoline engines, replacing, in some instances, and operating conditions, 70% of the diesel fuel, or gasoline with natural gas, propane or hydrogen. One embodiment is designed for light-duty pick-up trucks that are very popular in certain areas of the world. However, it will be appreciated that the present invention may be installed in heavy-duty vehicles, as well as off-road vehicles, stationary diesel and gasoline engines, as well as other diesel and gasoline engines.

As shown in FIG. 1, generally, most diesel or gasoline engines have an injection pump that has a throttle position sensor (TPS) 3 installed, which is used to determine throttle position (i.e., gas pedal) and engine load. The signal from the TPS 3 is received by the electronic control unit (ECU) 10 of the MFC 20 and together with the engine revolutions-per-minute (RPM) sensor 8 signal, the ECU 10 calculates the right amount of alternative fuel to inject. The MFC 20 may also use an exhaust temperature sensor 9 as a safety feature to prevent engine damage caused by high combustion temperatures. In addition, some embodiments of the MFC 20 may also use a knock sensor 6 to detect engine knocking (uncontrolled ignition) caused by over-fueling with the alternative fuel.

One feature of the present invention is that at any time the engine can revert back to 100% diesel or gasoline fuel use seamlessly, and without interruption, while the vehicle is in use. This feature is helpful in situations where the alternative fuel tank becomes empty.

One feature of the MFC 20 is that it does not require the substantial engine modifications of a 100% fuel-use conversion, which usually require replacement of pistons, piston rings, and new, or modified cylinder heads. One embodiment of the MFC 20 allows the engine to be re-converted to operate on 100% diesel or gasoline very easily. For example, the diesel fuel injectors are not replaced, nor are the pistons, piston rings, or cylinder heads.

In order to optimize the amount of alternative fuel delivery, several engine parameters should be monitored, such as engine load and RPM, which are usually constantly changing.

Conventional conversion systems that attempt to achieve 80 to 90% natural gas operation include sophisticated electronics and monitoring systems to keep converted engines from overheating and, in some cases, catastrophically failing from excessive combustion chamber temperatures.

Referring again to FIG. 1, one embodiment of the present invention includes an ECU 10 that directs one, or more fuel injector(s) 7 to inject a precise amount of alternative fuel into the engine's intake air stream, or directly into the combustion chamber. This embodiment injects alternative fuel into the intake air stream and employs a mixer 17 to mix the alternative fuel with the intake air. In one embodiment, the mixer 17 comprises a group of holes radially arranged around the outside of a substantially cylindrically shaped device. Alternative embodiments of the MFC 20 do not employ a mixer 17, and it will be appreciated that other mixer designs can also be employed by the present invention.

In a preferred embodiment, the present invention utilizes natural gas supplied from a refillable tank 13. The tank 13 is re-filled at the compressed natural gas (CNG) fuel valve 14.

The alternative fuel, such as natural gas, is passed to the mixer 17 by a pressure regulator 16 and CNG injector 5, as shown in FIG. 1. As engine load and RPM changes, a variety of sensors send signals to the ECU 10, which directs the CNG injector 5 to inject the appropriate amount of alternative fuel. In one embodiment, the CNG injector 5 is an electronic pulse-width modulated fuel injector, but other types of fuel injectors may be employed.

As illustrated in FIG. 1, one embodiment of the present invention includes several sensors, and other components, including an exhaust gas temperature sensor 9, manifold pressure sensor 2, throttle position sensor 3, CNG temperature sensor 4, engine RPM sensor 8, knock sensor 6, shut-off solenoid 15. The ECU 10 may also include circuitry for an OBD (On Board Diagnostic) 12 system that may include a data port and a MIL or warning light 11. It will be appreciated the alternative embodiments of the present invention may include more, less, or other sensors and components, as desired.

Generally, the ECU 10 calculates the correct amount of alternative fuel, by analyzing the information supplied by the various sensors and compares these values with an injection map that is contained in the ECU 10. The ECU 10 includes at least one general purpose digital computer and associated memory that includes computer code, or logic for analyzing the data received from the sensors, and instructing the various components communicating with the ECU 10.

In a preferred embodiment, the shut-off solenoid 15 valve will assure shutoff of the alternative fuel supply in case of accidents or if the engine does not run. Refilling of the CNG, or other type of alternative fuel tank 13 may be performed without any release of alternative fuel by employing of a CNG fill valve 14.

As discussed above, the present invention employs multiple sensors operating with the ECU 10. The ECU 10, may obtain signals from some of, or all of the following sensors:

| | |
|---|---|
| RPM Sensor 8: | Supplies information about engine speed. |
| Throttle Position Sensor 3: | Supplies information about fuel flow (throttle position) and together with engine speed represents engine load. |
| Exhaust Gas Temperature | |
| Sensor 9: | Supplies information about exhaust temperature. This information can be used to control the gas flow to the engine. The amount of gas may be reduced if the exhaust temperature exceeds a preset limit. |
| Gas Temperature | |
| Sensor 4: | Since gas temperature has a direct effect on gas density, this sensor is used to compensate for hot or cold gas. |
| Knock Sensor 6: | The knock sensor 6 sends a signal to the ECU 10 relating to engine knock. |
| The ECU 10 may send signals to the following units: | |
| Indicator 30: | The indicator 30 informs the driver how much gas is being injected. The driver controls how much gas he is using by watching, or listening to the indicator 30 and modifying the gas pedal position to a point where he uses the desired amount of alternative fuel. |
| Gas Injector 5: | Receives signals from the ECU 10 for accurate gas delivery. |
| Diagnostic Light and Error Codes 11: | The ECU 10 may be equipped with self-diagnostic logic. The ECU 10 may notify an operator or technician of system malfunctions. |
| The present invention may also include the following components: | |
| Gas Shut-Off Valve 15: | Isolates the high-pressure gas in the tank 13 from the rest of the system. The Shut-off valve 15 is only open when the engine is running. |
| Pressure Regulator 16: | Accurately regulates gas pressure. |
| Gas Tank Pressure Indicator: | Shows how much gas is in the tank. |

In a preferred embodiment of the present invention, the alternative fuel is contained in a fuel tank 13, and from there it travels to the gas pressure regulator 16. Just before the pressure regulator 16 is a safety shut-off solenoid valve 15 that isolates the high-pressure alternative fuel from the rest of the system when the system is turned off or the engine is not running. Downstream of the regulator 16 is the electronically controlled alternative fuel injector 5 that meters the gas into the intake manifold as directed by the ECU 10. The ECU 10 decides how much to inject based on the input from various sensors.

Figure 2B:
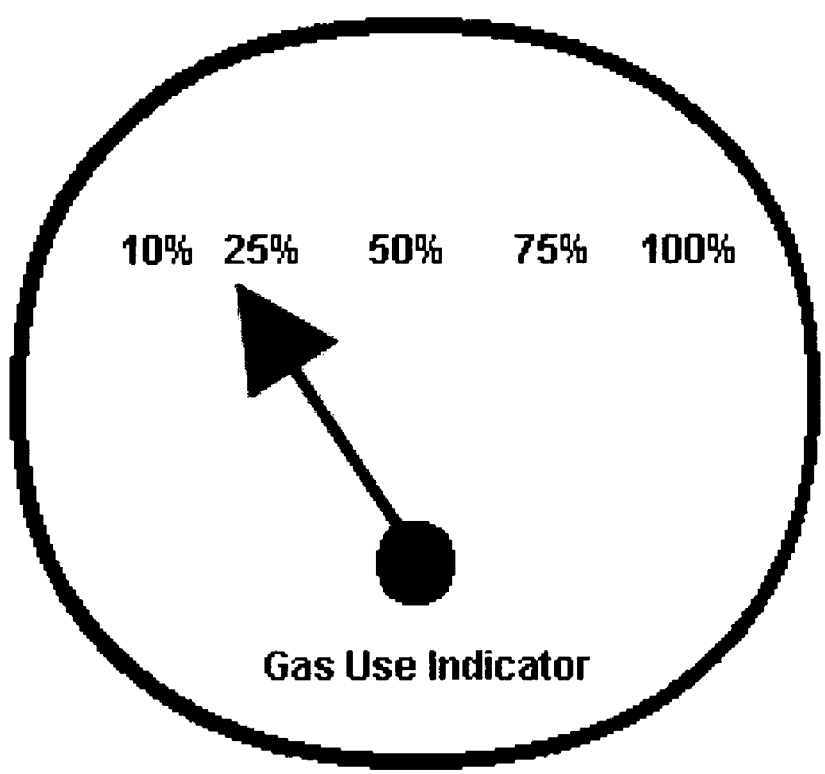

Referring now to FIGS. 2A and 2B, which illustrate two embodiments of an indicator 30, the driver or operator can determine how much alternative fuel to use by watching, or listening to the indicator 30, which indicates the amount of alternative fuel that is being used.

In one embodiment, the indicator 30 uses a light emitting diode (LED) display (shown in FIG. 2A) on the dashboard, or other location of the vehicle to inform the driver how much alternative fuel is being used. The amount of alternative fuel being used is, in part, based on the throttle, or accelerator position. Thus, the driver can control how much alternative fuel he or she is using by watching the indicator 30 and modifying the accelerator pedal position to a point where the most amount of alternative fuel is being used. One feature of this aspect of the present invention it that the driver is in control of how much alternative fuel he would like to use. If he decides to use the maximum amount of alternative fuel, he can lower his fuel costs substantially.

In one embodiment, the indicator 30 could be an array of multiple light sources, such as a group of LEDs. As the pulse-width of the gas injector(s) 5 increases, which corresponds to the amount of alternative fuel being injected, more LEDs would light up, possibly in a sequential manner. The number of lit LEDs increases with the amount of injected alternative fuel.

As shown in FIG. 2B, the indicator 30 may comprise an analog dial that indicates the amount of alternative fuel being used. Other types of indicators 30 may include an aural tone indicator, that beeps with increasing frequency as more alternative fuel is being used, or a "head-up" display that may be in the form of a visual information window placed in the operator's line of sight.

Figure 3:
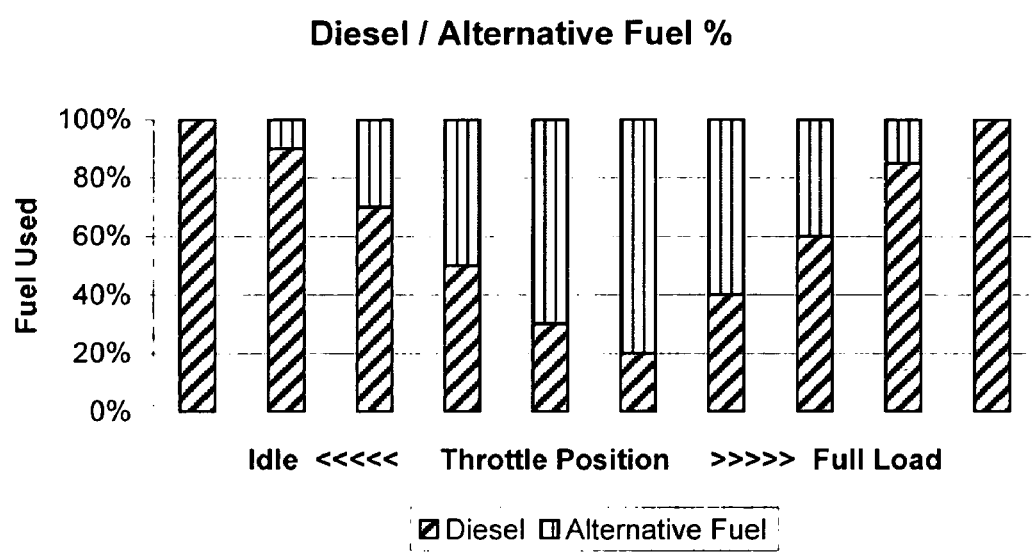
FIG. 3 is an illustrative chart comparing an amount of alternative fuel used versus a throttle or accelerator pedal position.

Referring now to FIG. 3, which illustrates a chart depicting an amount of alternative fuel used versus throttle, or accelerator pedal position. One feature of the indicator 30 is its ability to quickly teach the operator how to maximize use of the alternative fuel. This is because an engine using the MFC 20 system will function slightly differently. For example, as shown in FIG. 3, from idle (where 100% diesel is used), to about 70% load, the engine will run on increasingly larger amounts of alternative fuel. But, when the engine is under full load the engine will usually run almost exclusively on diesel fuel again (to avoid excessive combustion chamber temperatures). However, the engine will make more power earlier. That is, because additional fuel (the alternative fuel) is being injected into the engine, the throttle will be opened less than was the case before conversion to the MFC 20 system. This is illustrated in FIG. 3, which shows the maximum amount of alternative fuel use occurs at around 70% throttle opening. It will be appreciated that different engines may reach maximum alternative fuel use at other throttle positions, or openings, such as 60%, 80% or other throttle positions.

Thus, an MFC converted engine makes about the same power from a throttle position representing 70% to 80% load, as a non-converted engine makes at full throttle. Without the indicator 30, an operator will, out of habit, operate the throttle at an opening, or position that is greater than necessary. The indicator 30 greatly aids the operator in quickly adjusting their driving habits to the new engine characteristics. In addition, the indicator 30 acts as a reinforcement mechanism, encouraging the operator to maximize use of the alternative fuel, thereby saving fuel costs, and reducing pollution.

With use of the MFC 20, it is estimated that a 20%, 30% or greater reduction in fuel cost may be realized, with a commensurate reduction of particulate matter (PM) of 60% or more.

Thus, it is seen that apparatus' and methods for using alternative fuels in a diesel or gasoline engine are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. An engine apparatus, comprising:
    an injector structured to introduce a first fuel into an engine that also uses a second fuel;
    a controller structured to control the injector; and
    an indicator communicating with the controller, the indicator indicating a current amount of injected first fuel to an engine operator so that the engine operator can adjust the amount of injected first fuel.

2. The apparatus of claim 1, where the engine is selected from a group consisting of: an engine combusting diesel fuel and an engine combusting gasoline.

3. The apparatus of claim 1, where the first and second fuels are selected from a group consisting of: natural gas, propane, hydrogen, diesel fuel, and gasoline.

4. The apparatus of claim 1, further including a sensor communicating with the controller, the sensor selected from a group consisting of: a throttle position sensor, an engine revolutions-per-minute sensor, an exhaust temperature sensor, a knock sensor, an intake manifold pressure sensor, a fuel temperature sensor, a fuel tank pressure sensor, a fuel pressure regulator, and a mixer element.

5. The apparatus of claim 1, where the indicator is selected from a group consisting of: a gauge, an analog gauge, a display using lights, a light emitting diode display, a head-up display, and an aural indicator.

6. The apparatus of claim 1, where the controller is structured to control a diagnostic light that presents at least one diagnostic code.

7. A method of displaying fuel use, the method comprising the steps of:
    providing an engine that uses a first fuel and a second fuel; and
    providing an indicator that displays an amount of the first fuel used relative to the second fuel, the indicator informing a vehicle operator so that the vehicle operator can adjust the amount of the first fuel used relative to the second fuel.

8. The method of claim 7, where the engine is selected from a group consisting of: an engine using diesel fuel and an engine using gasoline.

9. The method of claim 7, where the first and second fuels are selected from a group consisting of: natural gas, propane, hydrogen, diesel fuel, and gasoline.

10. The method of claim 7, where the indicator is selected from a group consisting of: a gauge, an analog gauge, a display using lights, a light emitting diode display, a head-up display, and an aural indicator.

11. A multi-fuel conversion kit, comprising:
    an injector structured to introduce a first fuel into an engine that also combusts a second fuel;
    a controller structured to control the injector; and
    an indicator communicating with the controller, the indicator indicating a current amount of injected first fuel to an engine operator so that the engine operator can adjust the amount of injected first fuel.

12. The kit of claim 11, where the engine is selected from a group consisting of: an engine combusting diesel fuel and an engine combusting gasoline.

13. The kit of claim 11, where the first and second fuels are selected from a group consisting of: natural gas, propane, hydrogen, diesel fuel, and gasoline.

14. The kit of claim 11, further including a sensor communicating with the controller, the sensor selected from a group consisting of: a throttle position sensor, an engine revolutions-per-minute sensor, an exhaust temperature sensor, a knock sensor, an intake manifold pressure sensor, a fuel temperature sensor, a fuel tank pressure sensor, a fuel pressure regulator, and a mixer element.

15. The kit of claim 11, where the indicator is selected from a group consisting of: a gauge, an analog gauge, a display using lights, a light emitting diode display, a head-up display, and an aural indicator.

16. The kit of claim 11, where the controller is structured to control a diagnostic light that presents at least one diagnostic code.

* * * * *